G. ALFISI.
EGG BOILER.
APPLICATION FILED JUNE 21, 1919.
1,337,876. Patented Apr. 20, 1920.
2 SHEETS—SHEET 2.
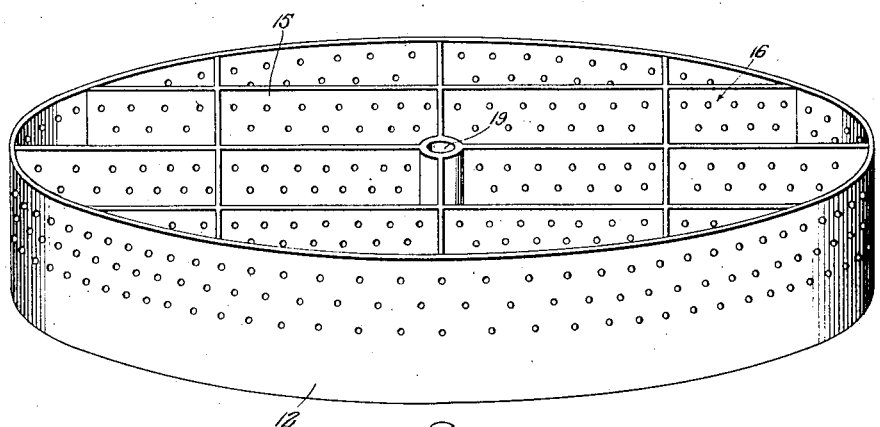
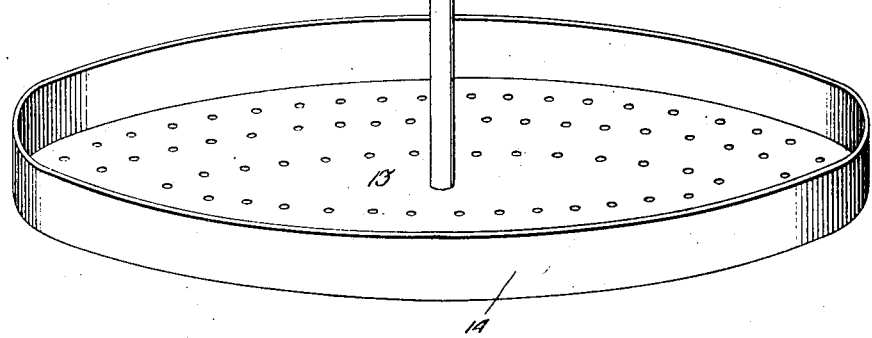
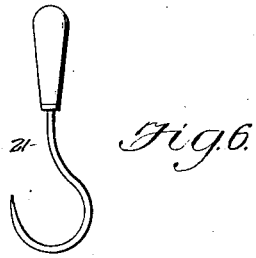
INVENTOR.
BY Giuseppe Alfisi,
ATTORNEY.

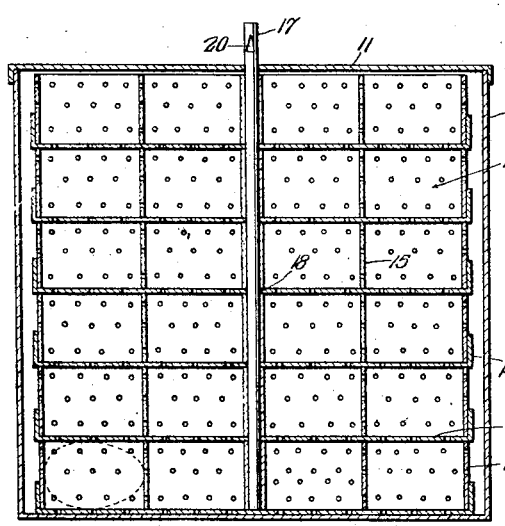
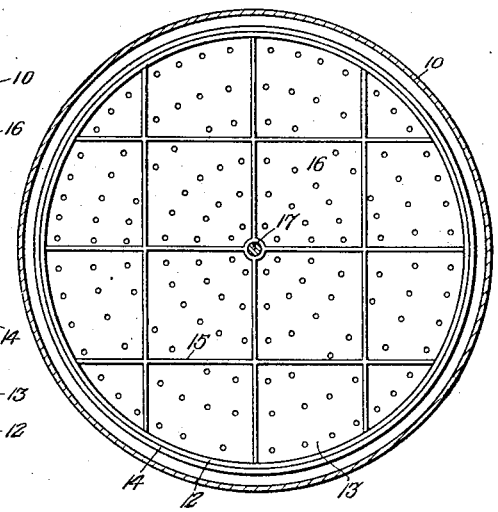
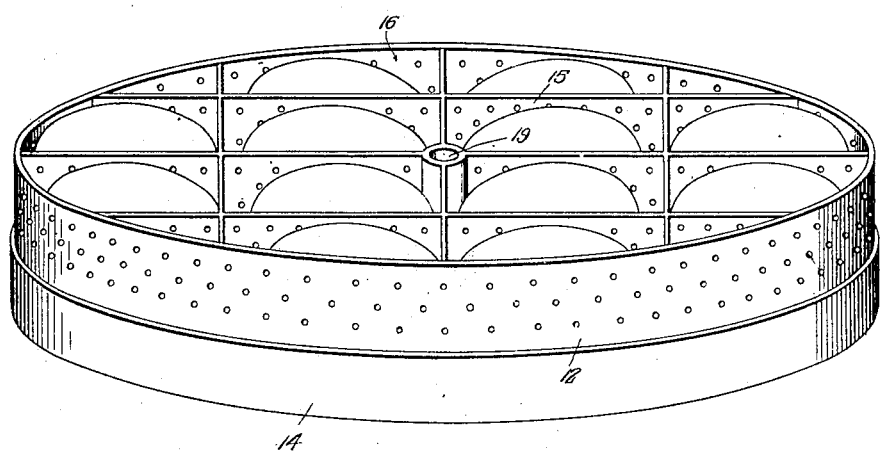

UNITED STATES PATENT OFFICE.

GIUSEPPE ALFISI, OF TORONTO, ONTARIO, CANADA.

EGG-BOILER.

1,337,876.

Specification of Letters Patent.

Patented Apr. 20, 1920.

Application filed June 21, 1919. Serial No. 305,771.

*To all whom it may concern:*

Be it known that I, GIUSEPPE ALFISI, a subject of the King of Italy, residing at Toronto, in the Province of Ontario and Dominion of Canada, have invented new and useful Improvements in Egg-Boilers, of which the following is a specification.

This invention relates to cooking utensils and has a special relation to egg boilers.

An object of the present invention is to provide a receptacle in which any number of eggs may be boiled without danger of breakage from contact, separate individual egg compartments being provided, in which the eggs remain during the boiling operation.

Another object is the provision of an egg boiler which includes a number of separate egg containers removably positioned within a receptacle and constructed to expose the entire surface of the egg to the action of boiling water, the containers being held in associated relation to permit of conveniently placing the eggs therein and to provide for their simultaneous insertion into and removal from the receptacle.

The invention further includes the following novel features and details of construction, to be hereinafter more fully described and illustrated in the accompanying drawings.

In the drawings:

Figure 1 is a vertical sectional view through an egg boiler embodying the present invention.

Fig. 2 is a horizontal sectional view of the same.

Fig. 3 is a perspective view of one of the containers filled with eggs.

Fig. 4 is a similar view of one of the containers empty and the bottom of the container removed.

Fig. 5 is a detail perspective view of the bottom of the lowermost container.

Fig. 6 is a detail of the removable hook.

Referring in detail to the drawings, like characters of reference denote corresponding parts throughout the several views.

In carrying out the invention, there is provided a receptacle 10, in which water is placed in the usual manner for boiling the eggs. This receptacle may be of any desired construction and is preferably provided with a cover 11, to more readily bring the water to a boiling point.

The invention resides in the novel formation of egg containers and their arrangement within the receptacle. These containers are preferably but not necessarily of the same shape as the cross sectional shape of the receptacle and may be of a diameter to fit within the receptacle and permit of the passage of water between their sides and the inner wall of the receptacle. These containers are formed with perforated side walls 12 and a perforated bottom 13, the latter being provided with an annular flange 14, so as to receive the side walls of the container. These containers are arranged within the receptacle in superimposed relation and are each provided with perforated partitions 15, to provide separate egg receiving compartments 16, in which the eggs may be positioned, the perforations exposing the entire egg to the action of the boiling water.

The bottom 13 of the lowermost container is provided with a centrally disposed upwardly extending standard 17, which passes through a central opening 18 in the bottom of the upper containers and through an opening 19 between the partitions 15 and the said upper containers, so that the latter may be threaded upon the standard to hold all of the containers together as a unit to facilitate their insertion into and removal from the receptacle 10.

To further provide for the convenience of the insertion and removal of the containers, the upper end of the standard 17 is formed with an opening 20, for the reception of a hook 21, or other convenient implement. This permits of handling the containers without subjecting the hands of the cook to the action of steam arising from the boiling water. By forming the containers in the manner shown and described, they may be readily separated for the purpose of inserting or removing the eggs from the compartments 16, the latter operation being effected by lifting the perforated side wall 12 and partitions 15 from the bottom 13, leaving the eggs in the said bottom to act as a tray, the perforations in the bottom providing for the drainage of water from the eggs. This also permits of subjecting the eggs for a short time to the action of cool water to permit of their being more easily handled, if desired.

The invention is susceptible of various changes in its form, proportions and minor details of construction and the right is herein reserved to make such changes as properly fall within the scope of the appended claims.

Having described the invention, what is claimed is:

1. An egg boiler comprising a receptacle, a plurality of containers removably positioned therein in superimposed relation and divided into separate egg receiving compartments and a standard projecting upwardly from the lowermost container and threaded through the upper containers to hold the latter assembled and provide for their simultaneous insertion into and removal from the receptacle.

2. An egg boiler comprising a receptacle, a plurality of containers removably positioned therein in superimposed relation, each of said containers being divided into separate egg receiving compartments and having a removable bottom and a standard projecting upwardly from the bottom of the lowermost container and threaded through the upper containers to hold the latter associated and to provide for their simultaneous insertion into and removal from the receptacle.

In testimony whereof I affix my signature.

GIUSEPPE ALFISI.